Oct. 2, 1934. C. M. MURDOCK Re. 19,333

TUNING COIL SHIFTER

Original Filed Nov. 24, 1931 2 Sheets-Sheet 1

C. M. Murdock, INVENTOR

BY Victor J. Evans & Co. ATTORNEY

Oct. 2, 1934. C. M. MURDOCK Re. 19,333

TUNING COIL SHIFTER

Original Filed Nov. 24, 1931 2 Sheets-Sheet 2

C. M. Murdock, INVENTOR

BY Victor J. Evans & Co.

ATTORNEY

Reissued Oct. 2, 1934

Re. 19,333

UNITED STATES PATENT OFFICE 19,333

TUNING COIL SHIFTER

Charles M. Murdock, Maywood, Calif.

Original No. 1,873,658, dated August 23, 1932, Serial No. 577,121, November 24, 1931. Application for reissue December 9, 1933, Serial No. 701,883

11 Claims. (Cl. 171—119)

The object of the invention is to provide a device adapted to hold a full set of the conventional interchangeable coils employed as tuners in radio apparatus to cover the full band of frequencies from the low wave, through the broadcast band and above the latter, so that the desired coil may be immediately put in circuit by means exposed on the panel of the receiver; to provide a construction for interchangeable coils that will permit the inclusion of a selected one in circuit with the same length of leads as any other one, so that there may not be the disadvantages resulting from switching arrangement such as where the coils are cut into and out of circuit by the manipulation of the switch; to provide a device of the nature described in which there will be indicated on the front of the dial the particular coil in circuit; to provide a construction that will insure the retention of the selected coil in circuit; to provide a contacting device that will insure firm contact with the terminals of the coil connected in circuit; and to, provide generally a device of this nature which is of simple form, of a character that may be manufactured at moderate expense, and of a construction susceptible of incorporation in conventional radio apparatus without material modification thereof.

With this object in view the invention consists in a construction and combination of parts of which a preferred embodiment is illustrated in the accompanying drawings, but to which embodiment the invention is not to be restricted. Continued use in practice may suggest certain changes or alterations and the right is claimed to make any change falling within the scope of the appended claims.

Figure 1:
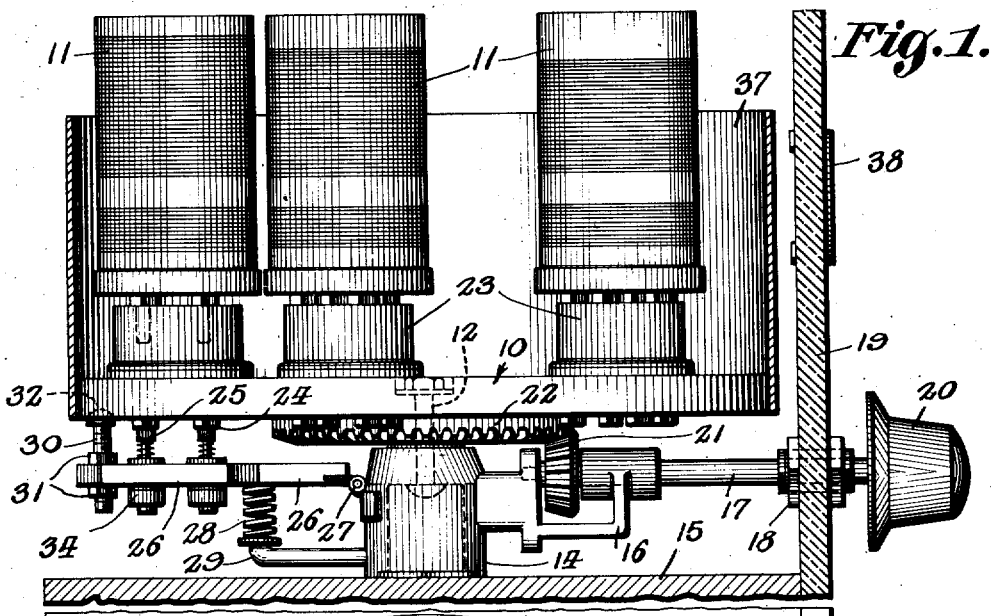
Figure 1 is a side elevational view of the invention, the base and panel of the connected instrument being shown in section, as well as certain other parts.
Figure 2:
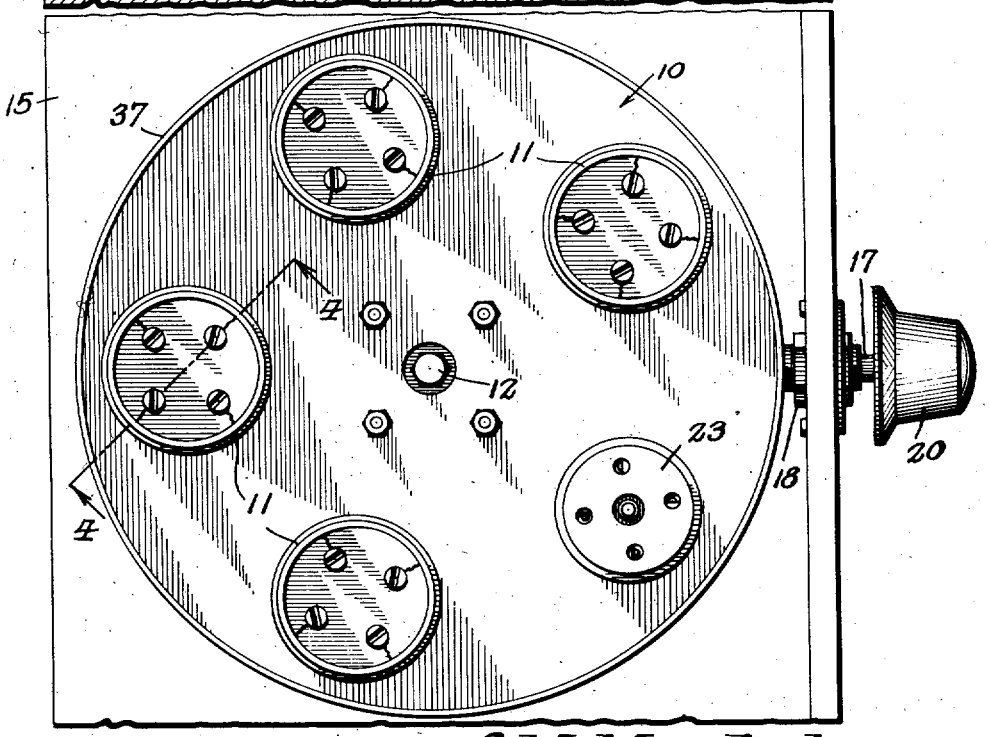
Figure 2 is a top plan view of the structure of Figure 1.
Figure 3:
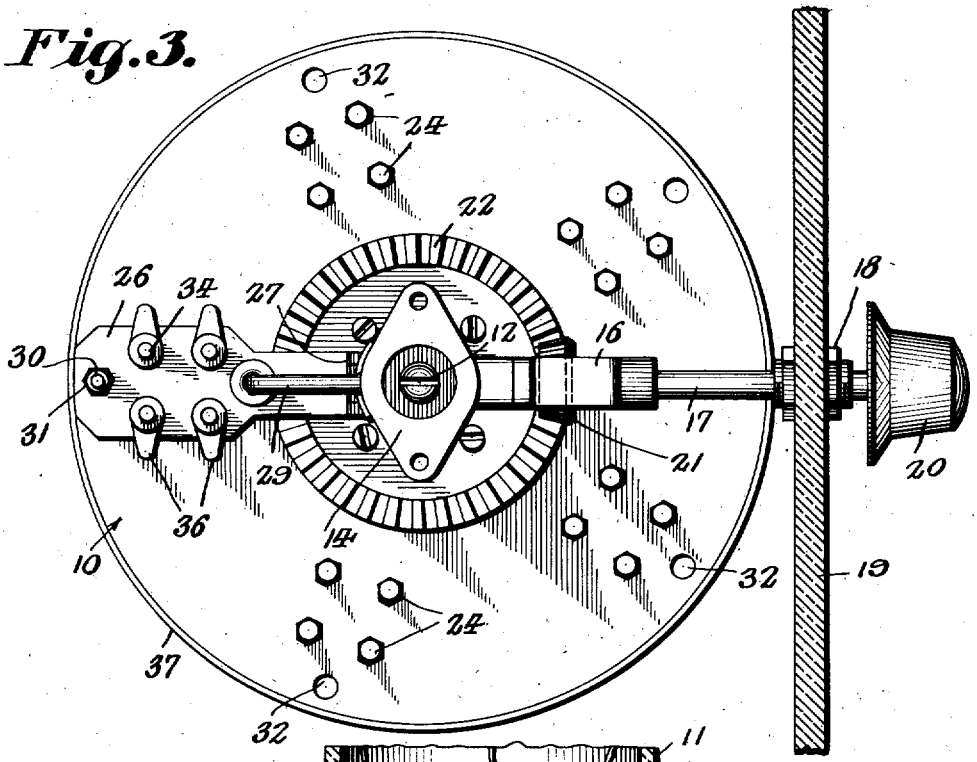
Figure 3 is a bottom plan view of the structure of Figure 1, the panel being shown in section.
Figure 4:
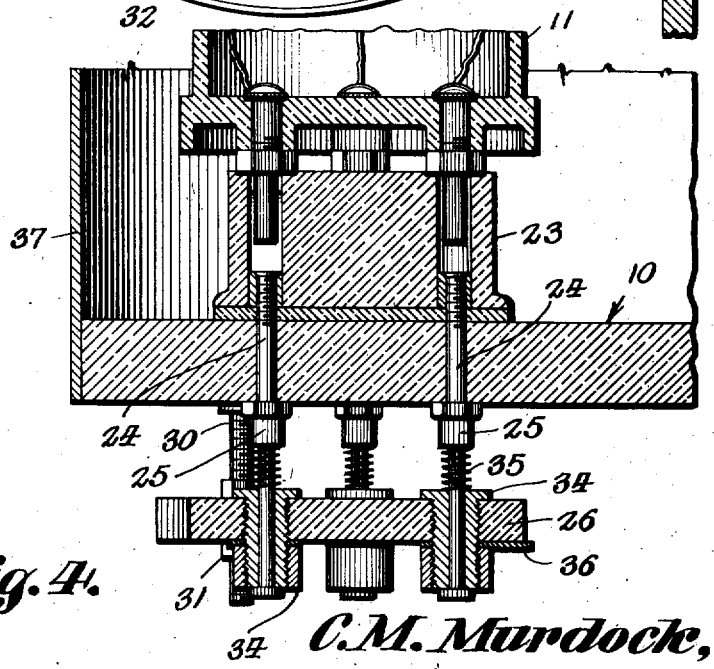
Figure 4 is a sectional view on the plane indicated by the line 4—4 of Figure 1.

Instead of a plurality of different coils for selective insertion in a receiving socket, or a multiple switch positionable to include any one of a plurality of tuning coils in circuit, the invention provides for mounting of the coils employed on a single movable table, such as that indicated at 10. Movement of the table 10 is desired to accomplish the connection in circuit of any, one of the coils 11 which are wound for different wave lengths, so that the short wave, broadcast and higher bands may be covered. Movement of the table in the illustrated embodiment is accomplished by rotation, the table having a king pin 12 journaled in a support 14, the latter being mounted on the base 15 of the radio apparatus and having a bracket portion 16 in which is journaled a shaft 17, the latter being disposed below the plane of the table and also having a bearing in the front panel 19, exterior to which the shaft is provided with a finger knob 20 by means of which it may be rotated.

The shaft 17 constitutes actuating means for the table and to this end is provided on one extremity with a beveled gear 21, the latter meshing with a beveled gear 22 mounted on the under face of the table concentrically with the king pin 12.

In the illustrated embodiment the coils 11 shown are of the detachable type and to provide for their being mounted on the table 10, the latter is provided with a plurality of sockets 23, preferably, but not necessarily spaced at uniform angular distances around the table. The table being of insulated material, the sockets are secured to the table as by cap screws 24, these cap screws passing through the table and threading into the socket in the coil pin receiving holes of the latter. The cap screws thus serve as contact members on the under face of the table, by reason of being connected with the pin receiving hole of the socket, so that one terminal of each winding on the coil is electrically connected with one of the cap screws 24.

Instead of sockets 23, the coils may be permanently attached to the table with combined contacting and securing means such as the cap screws 24.

None of the coils 11 is in circuit until the table is so positioned for the contact members 24 of any coil to be positioned above the spring impelled contact members 25 which are carried by a yieldingly mounted insulating plate 26. The plate 26 is hingedly connected, as indicated at 27, with the support 14 and rests upon a compression spring 28 seated at one end on the arm 29 extending from the support 14. The spring thus serves to raise the plate 26, but the height it may be elevated is determined by the stop screw which passes through the free end of the plate and is provided with clamp nuts 31 above and below the plate.

When the contact members 24 of any coil are in position to engage the contact members 25 of the plate the head of the stop screw 30 engages in a seat 32 on the under face of the plate, there being a seat properly positioned with respect to each coil, so that the table may be retained in circuit engaging position for any coil.

The contact members 25 consist of headed studs slidably mounted in bushings 34 which are in turn mounted in the plate 26. Each contact member 25 is individually yieldingly mounted by reason of a compression spring 35 compressed between its head and the upper face of its attendant bushing.

Each bushing has secured thereto a lug 36 by which connection may be made to appropriate parts of the radio apparatus by means of pigtail or other flexible conductors.

In operating the invention rotation of the handle 20 serves to rotate the table 10 and angular movement imparted to the table results in depressing the plate 26 by reason of the head of the stop screw being then disengaged from its seat 32, after which the head of the screw slides against the under face of the table in the angular movement of the latter. Depression of the plate 26, also permits the contact members 24 being disengaged from the contact members 25 and the coil which had previously been connected in circuit is thus disconnected and another connected in its place when the table is brought to rest with the stop screw engaging the seat 32 associated with the selected coil.

To provide for the operator or user being able to determine visibly what particular coil is in circuit, the table is surrounded with an annular strip 37, this constituting a drum on the peripheral face of which may be inscribed indicia visible through a window 38 and indicating to the operator the particular coil in circuit.

The invention having been described what is claimed as new and useful is:—

1. A coil shifting device comprising a movable table, a plurality of coils carried on said table, a stationary member having contacts for connection in the circuit of radio apparatus, and means for effecting movement of the table to selectively position any of the coils over said stationary member with its terminals in end engagement with the contacts of the latter, the stationary member having a spring yieldingly impelling it toward the table, and the latching means consisting of a stop carried by said member and engageable with seats in the under face of the table, and the contacts carried by said member being each spring impelled to render them individually yieldable.

2. In a device as described a case having a sight opening, a turntable in said case, a circumferential series of coils seated on the turntable, means for rotating the turntable, a stationary movable lever under said turntable, sets of contacts on the under face of the turntable for each separate coil, a single set of contacts on said lever, means on said lever wiping the under face of the turntable as the latter turns and adapted to separate the lever contacts from the coil contacts, and means whereby the other means may automatically and successively halt the turntable as each coil is positioned opposite said sight opening and for simultaneously contacting one set of coil contacts with the lever contacts.

3. In a tuning coil shifting apparatus, a rotatable carrier having coils thereon and having a flat outer surface, a stationary spring pressed lever opposite said surface, means for rotating said carrier, sets of contacts flush with said surface for the several coils of the carrier, a set of contact means fixed on said lever concentrically with the other sets of contacts, a stop screw carried by said lever and being wiped by said carrier as the latter rotates, for separating the contact means from any of the set of contacts, and means whereby the stop screw halts the carrier automatically and releasably when each successive coil is successively positioned over the screw and whereby the contact means automatically engage the set of contacts for the last named coil.

4. In a tuning coil shifter apparatus, a turntable having a circumferential series of sets of contacts flush with its outer surface, a stationary set of contacts, manual means for rotating the turntable to present each successive set of contacts over the stationary set, means for separating the stationary set of contacts from the other sets as the turntable rotates, and means for automatically and releasedly halting the turntable and for contacting the stationary set of contacts with any selective set of turntable contacts.

5. In a device as described, a turntable, a series of socket members circumferentially mounted on the inner face thereof, a series of coils having a detachable contact engagement with the several socket members, sets of contact points in the separate socket members extending to the outer face of the turntable, a stationary set of contacts, means for rotating the turntable to move each set of contact points, and means for automatically moving the stationary set of contacts selectively into abutting relation with any of the sets of contact points and for separating them whilst they move towards the contact points.

6. In a device as described the combination of a table carrying radially separated coils with depending contacts for each coil, means rotating said table, a stationary set of contacts, means yieldingly supporting said stationary set of contacts and means on said supporting means being constantly held in engagement with the table for inducing movement of the supporting means towards and from the table, for causing alternate engagement and disengagement of each set of coils contacts with the stationary contacts as the table rotates and for halting the table periodically while said sets of contacts engage.

7. In a device as described a plurality of tuning coils, a panel board having a window, means for successively positioning each coil selectively opposite said window, a set of contacts carried by each coil, a set of stationary contacts spaced opposite to said window, and engageable with any selective set of contacts of any coil as it is positioned opposite said window, between which stationary contacts and said window each set of coil contacts moves en route to engage the stationary contacts, and means controlled by said first means for automatically moving the stationary sets of contacts into engagement with the contacts of the selectively positioned coil.

8. In a device as described having a panel board formed with a window, a set of contacts stationed opposite to said window, a plurality of tuning coils each of which is movably positioned opposite to said window and carrying each a set of fixed contacts against which said first set of contacts moves to effect automatic engagement as the coil is so positioned, and means for automatically timing the contacting of the first set of contacts and the sets of coil contacts.

9. In a radio set, a case having a panel board window, a rotatable table, a knob on the panel board for actuating the table, a set of coils detachably mounted on one side of the table so as to move therewith, and having separate sets of contact points, a stationary set of contacts located diametrically across said table from said window and movable towards the other side of the table to engage with any selective set of contact points stopping thereagainst, and means controlled by the table for stopping the mentioned set of points and controlling the movement of the stationary set of contacts.

10. In a device as described, a base, a support thereon, a turntable journaled in said support for rotation, and having on its under side a circumferentially spaced apart series of notches and also a set of contact points adjacent each notch, tuning coils on the upper side of the turntable each carrying one set of contact points, a lever pivoted to said support and carrying a pin whose rounded head is yieldingly pressed against the underside of said turntable as the latter rotates whereby to automatically enter any notch to releasedly halt the turntable, and a single set of contacts mounted on said lever automatically snapping into engagement with a selective set of coil contact points as the pin head enters a notch.

11. In a device as described, in combination a manually oscillatable turntable carrying spaced surmounted coils, means fixed so as to extend radially of and under the turntable and so as to move towards and from the latter, an electrical circuit, means operable as the first means moves towards the turntable, in one direction, to stop the latter and to cause said circuit to be closed to one tuning coil, and means controlled by said turntable for actuating the last-named movement of the first means and for causing the latter to move in a counter direction to open the circuit to the mentioned coil.

CHARLES M. MURDOCK.